United States Patent
Liu et al.

(10) Patent No.: US 12,047,877 B2
(45) Date of Patent: Jul. 23, 2024

(54) METHOD AND DEVICE FOR SENDING AND RECEIVING WAKE UP SIGNAL, AND ELECTRONIC DEVICE

(71) Applicant: ZTE Corporation, Shenzhen (CN)

(72) Inventors: Xu Liu, Shenzhen (CN); Bo Dai, Shenzhen (CN); Xiubin Sha, Shenzhen (CN)

(73) Assignee: ZTE CORPORATION, Shenzhen (CN)

( * ) Notice: Subject to any disclaimer, the term of this patent is extended or adjusted under 35 U.S.C. 154(b) by 448 days.

(21) Appl. No.: 17/424,035

(22) PCT Filed: Jan. 13, 2020

(86) PCT No.: PCT/CN2020/071802
§ 371 (c)(1),
(2) Date: Jul. 19, 2021

(87) PCT Pub. No.: WO2020/147686
PCT Pub. Date: Jul. 23, 2020

(65) Prior Publication Data
US 2022/0104125 A1 Mar. 31, 2022

(30) Foreign Application Priority Data
Jan. 18, 2019 (CN) .......................... 201910108919.5

(51) Int. Cl.
G08C 17/00 (2006.01)
H04W 52/02 (2009.01)
H04W 68/02 (2009.01)

(52) U.S. Cl.
CPC ... *H04W 52/0219* (2013.01); *H04W 52/0229* (2013.01); *H04W 68/02* (2013.01)

(58) Field of Classification Search
CPC ............. H04W 52/02; H04W 52/0219; H04W 52/0229; H04W 52/0216; H04W 68/02; H04W 84/12; H04W 84/18
(Continued)

(56) References Cited

U.S. PATENT DOCUMENTS

2018/0027495 A1 1/2018 Song
2018/0359704 A1* 12/2018 Li ..................... H04W 52/0219
(Continued)

FOREIGN PATENT DOCUMENTS

CN 101395846 A 3/2009
CN 104581894 A 4/2015
(Continued)

OTHER PUBLICATIONS

International Search Report for corresponding application PCT/CN2020/071802 filed Jan. 13, 2020; Mail date Mar. 19, 2020.
(Continued)

*Primary Examiner* — Temica M Beamer
(74) *Attorney, Agent, or Firm* — CANTOR COLBURN LLP

(57) ABSTRACT

Provided are a method and device for sending and receiving a Wake Up Signal (WUS), and an electronic device. The sending method includes: negotiating, by a communication node, with a terminal about a service type of the terminal; and sending, by the communication node, a WUS according to the service type.

19 Claims, 6 Drawing Sheets

A communication node negotiates with a terminal about a service type of the terminal — S102

The communication node sends a WUS according to the service type — S104

(58) Field of Classification Search
USPC .......................................................... 370/311
See application file for complete search history.

(56) References Cited

U.S. PATENT DOCUMENTS

| | | | | |
|---|---|---|---|---|
| 2019/0223147 | A1* | 7/2019 | Chen | H04W 68/02 |
| 2019/0313475 | A1* | 10/2019 | Siomina | H04W 76/28 |
| 2020/0145921 | A1* | 5/2020 | Zhang | H04W 52/0235 |
| 2020/0196242 | A1* | 6/2020 | Höglund | H04W 8/08 |
| 2021/0127354 | A1* | 4/2021 | Rune | H04W 56/001 |
| 2021/0212153 | A1* | 7/2021 | Siomina | H04W 76/28 |

FOREIGN PATENT DOCUMENTS

| | | | |
|---|---|---|---|
| CN | 106464379 | A | 2/2017 |
| CN | 108738110 | A | 11/2018 |
| EP | 3902336 | A1 | 10/2021 |
| WO | 2018061766 | A1 | 4/2018 |

OTHER PUBLICATIONS

Canadian Office Action for corresponding application 3, 127, 114 dated Jan. 9, 2024.
Ericsson, Wake Up Signal for NB-IoT & eMTC, 3GPP TSG-RAN 2 Meeting #99bis, Prague, Czech, Oct. 9-13, 2017, R2-1710749.
Ericsson, Wake Up Signal, 3GPP TSG-RAN 2 Meeting #101bis, Sanya China Apr. 16-20, 2018, R2-1804962.
European Search Report for corresponding application EP 20 74 1486; Report dated Feb. 9, 2022.
Nokia, Nokia Shanghai Bell, Analysis of Group WUS Options, 3GPP TSG-RAN WG2 Meeting #104 Spokane, USA Nov. 12-16, 2028, R2-1817048.

* cited by examiner

METHOD AND DEVICE FOR SENDING AND RECEIVING WAKE UP SIGNAL, AND ELECTRONIC DEVICE

The present disclosure is a national stage filing of PCT International Application No. PCT/CN2020/071802 filed on Jan. 13, 2020, which claims priority to Chinese Patent Application No. 201910108919.5 filed with the China National Intellectual Property Administration on Jan. 18, 2019, the disclosure of which is incorporated herein by reference in its entirety.

TECHNICAL FIELD

The present disclosure relates to the field of communications, and for example, to a method and device for sending and receiving a Wake Up Signal (WUS), and an electronic device.

BACKGROUND

A WUS is introduced in the Release 15 stage. For terminals having the same Paging Occasion (PO), if there is a terminal needing to be paged, a base station sends a WUS before the PO, and the terminals will detect the WUS and further monitor a page message after detecting the WUS. There are three types of gaps for the WUS configured by the terminal, i.e., Discontinuous Reception_gap (DRX_gap), short_extended-DRX_gap (short_eDRX_gap), and long_e-DRX_gap. Herein, the gap refers to an interval between a start moment when the WUS starts to be monitored and the PO. Therefore, after the base station receives paging messages sent by the core network, terminals supporting the WUS are divided into groups according to all types of gaps before the PO. In cases where none of the terminals having the same type of gap needs to be paged, the base station will not send the WUS at the WUS location corresponding to this type of gap; and in cases where at least one of the terminals having the same type of gap needs to be paged, the base station will send the paging messages.

According to relevant parameters concerning configuration of the WUS in a received System Information Block (SIB) message, such as a gap value (time offset) between the WUS and the current PO and a duration of the WUS, the terminal can determine the start location for the detection of the WUS by reading the configuration of the WUS in the SIB message.

However, for a group of terminals (e.g., User Equipment (UE)) having the same type of gap, in cases where the group contains a large number of terminals but only a small number of terminals need to be paged, because the WUS needs to be sent for the entire group, other terminals having the same type of gap will be mistakenly woken, thereby bringing additional power consumption to these terminals.

SUMMARY

Embodiments of the present disclosure provide a method and device for sending and receiving a WUS, and an electronic device, which may at least solve the problem of mistakenly waking up terminals after a WUS is sent in the related art.

According to some embodiments of the present disclosure, provided is a method for sending a WUS, including: negotiating, by a communication node, with a terminal about a service type of the terminal; and sending, by the communication node, a WUS according to the service type.

According to some other embodiments of the present disclosure, provided is a method for receiving a WUS, including: negotiating, by a terminal, with a communication node about a service type of the terminal; and receiving, by the terminal, a WUS sent by the communication node according to the service type.

According to still other embodiments of the present disclosure, provided is a device for sending a WUS, which is applied to a communication node and includes: a first negotiating module, configured to negotiate, with a terminal, a service type of the terminal; and a sending module, configured to send a WUS according to the service type.

According to still other embodiments of the present disclosure, provided is a device for receiving a WUS, which is applied to a terminal and includes: a second negotiating module, configured to negotiate with a communication node about a service type of the terminal; and a receiving module, configured to receive a WUS sent by the communication node according to the service type.

According to still other embodiments of the present disclosure, provided is an electronic device, including a memory and a processor, wherein the memory stores a computer program, and the processor is configured to run the computer program to execute the described method for sending a WUS.

According to still other embodiments of the present disclosure, provided is an electronic device, including a memory and a processor, wherein the memory stores a computer program, and the processor is configured to run the computer program to execute the described method for receiving a WUS.

By means of the embodiments of the present disclosure, a communication node sends a WUS according to a service type of a terminal negotiated with the terminal, thereby preventing terminals of different service types from being woken up, solving the problem of mistakenly waking up terminals after a WUS is sent in the related art, and improving the accuracy of waking up terminals.

DETAILED DESCRIPTION

The present disclosure is described below in detail with reference to the drawings and in conjunction with the embodiments. It is to be noted that embodiments in the present application and characteristics in the embodiments may be combined to derive other embodiments not explicitly described.

It is to be noted that the terms "first", "second" and the like in the specification, the claims and the drawings of the present disclosure are used to distinguish similar objects, and are not used to describe a specific sequence or a precedence order.

Embodiment 1

Figure 1:
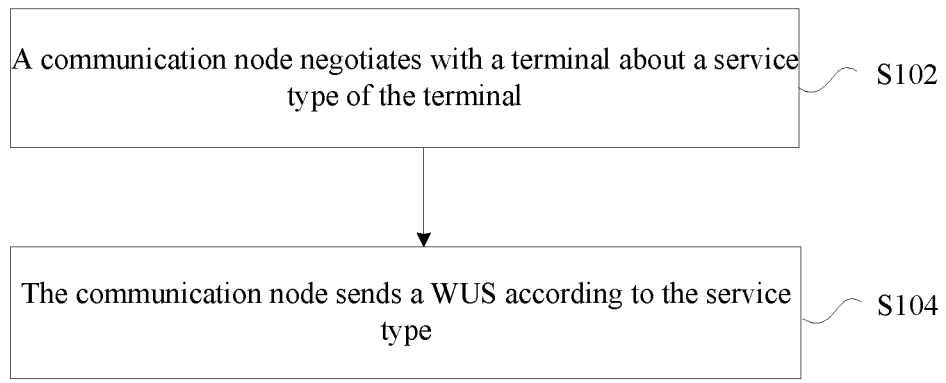
FIG. 1 is a flowchart of a method for sending a WUS according to an embodiment of the present disclosure.

Provided in the embodiment is a method for sending a WUS. FIG. 1 is a flowchart of a method for sending a WUS according to an embodiment of the present disclosure. As shown in FIG. 1, the method includes the following operations.

At operation S102, a communication node negotiates with a terminal about a service type of the terminal.

At operation S104, the communication node sends a WUS according to the service type.

By means of the operations S102 and S104, a communication node sends a WUS according to a service type of a terminal negotiated with the terminal, thereby preventing terminals of different service types from being woken up, solving the problem of mistakenly waking up terminals after a WUS is sent in the related art, and improving the accuracy of waking up terminals.

It should be noted that the communication node involved in the embodiments of the present disclosure includes a Mobility Management Entity (MME) and a base station.

Based on this, the manners in which the communication node negotiates with the terminal about the service type of the terminal involved in operation S102 in the embodiment include Manner 1 and Manner 2 which are described in detail as follows.

Manner 1: an MME receives a first request message sent by the terminal; and the MME sends, in response to the first request message, a response message to the terminal, wherein the response message carries a service type identifier for indicating the service type.

Manner 2: an MME receives a second request message sent by the terminal, wherein the second request message carries a service type identifier for indicating the service type; and the MME sends, in response to the second request message, a response message carrying a service type identifier acknowledgement to the terminal.

It can be seen from the described Manner 1 and Manner 2 that, with regard to the negotiation process between the communication node and the terminal involved in the embodiment, the negotiation may happen between an MME and the terminal. Specifically, the negotiation may be implemented by notifying, by the terminal, the MME of a service type of the terminal, or may be implemented by notifying, by the MME, the terminal of a service type of the terminal.

The foregoing is a manner for determining the service type in the embodiment. In another exemplary implementation of the embodiment, another manner for determining the service type is provided. Before the MME negotiates with the terminal about the service type of the terminal, the method in the embodiment may further include the following operations.

At operation S100, a base station obtains all sub-service type identifiers in a cell covered by the base station to obtain sub-service types.

At operation S101, the base station groups the sub-service types according to service types to obtain a grouping relation, wherein the grouping relation indicates a correspondence between one service type and one or more sub-service types.

In some specific application scenarios, the above operation S100 and operation S101 may be implemented as follows.

The base station determines specific service division according to all sub-service types within a cell range. For example, it is assumed that all the sub-service types in the cell range include: service_identifier (service_id) a1, service_id a2, service_id a3, service_id a4, and service_id a5, then possible service group division of the base station may be, for example, service_id 1: service_id a1, service_id a2; service_id 2: service_id a3, service_id a4, service_id a5. In this example, the service_id 1 corresponds to the service type involved in the embodiment, i.e. a service type negotiated between the MME and the terminal in the described Manner 1 and Manner 2, and service_id a1, service_id a2, service_id a3, service_id a4 and service_id a5 are sub-service types. Finally, the base station broadcasts this service division to the terminal via an SIB message.

Based on this, the operation that the communication node negotiates with the terminal about the service type of the terminal in the embodiment may include the following operations.

At operation S102-11, an MME negotiates with the terminal about a sub-service type of the terminal.

At operation S102-12, the MME sends a System Information Block (SIB) message to the terminal, wherein the SIB message carries a grouping relation.

It can be seen that, in another manner for determining the service type in the embodiment, after the base station determines a grouping relation, a terminal determines the service type of the terminal according to the grouping relation.

In some exemplary implementations of the embodiment, the operation that the communication node sends the WUS according to the service type involved in the embodiment may include the following operations.

At operation S104-11, a base station determines a group corresponding to the WUS according to the service type.

At operation S104-12, the base station sends the WUS according to the group corresponding to the WUS.

That is to say, with regard to the WUS, it is necessary to firstly determine the group corresponding to the WUS so as to accurately send the WUS.

It should be noted that, after the communication node sends the WUS according to the service type, the method of the embodiment may further include an operation that the base station sends a paging message to the terminal according to the service type.

Paging message parameters may be configured in the following manners. The paging message parameters may be independently configured for each service type, wherein the paging message parameters include: nB, the number of paging carriers, and a gap between a WUS and the moment of sending paging. Alternatively, a part of the paging message parameters may be independently configured for each service type, and a part of the paging message parameters may be shared by all service types, for example, the gap may be independently configured for each service type, and the nB may be shared by all service types.

For example, information element configuration of paging parameters configured according to various service types is as follows.

```
ServiceTypeList-r16 ::=         SEQUENCE (SIZE (1..maxServiceType)) OF ServiceTypeInfo
ServiceTypeInfo ::=   SEQUENCE {
    defaultPagingCycle-r16          ENUMERATED {
                                    rf32, rf64, rf128, rf256},
    nB-r16                          ENUMERATED {
                                    fourT, twoT, oneT, halfT, quarterT, oneEighthT,
                                    oneSixteenthT, oneThirtySecondT}
    PagingCarrier-r16               ENUMERATED {
                                    1, 2, 3, 4,5,6,7,8,9,10,11,12,13,14,15,16},
        maxDurationFactor-r16       WUS-MaxDurationFactor-NB-r15,
    numPOs-r16                      ENUMERATED {n1, n2, n4}  DEFAULT n1,
    numDRX-CyclesRelaxed-r16        ENUMERATED {n1, n2, n4, n8},
    timeOffsetDRX-r15               ENUMERATED {ms40, ms80, ms160, ms240},
    timeOffset-eDRX-Short-r16       ENUMERATED {ms40, ms80, ms160, ms240},
    timeOffset-eDRX-Long-r16        ENUMERATED {ms1000, ms2000}  OPTIONAL, --
Need OP
    ...
    ...
}
```

In the embodiment, service types may be divided in at least one of the following manners: dividing according to a service cycle, dividing according to Quality of Service (QoS), and dividing according to a service attribute defined by a core network.

For example, the service types may be divided according to the service cycle as: long cycle service, short cycle service, and general cycle service.

Embodiment 2

Figure 2:
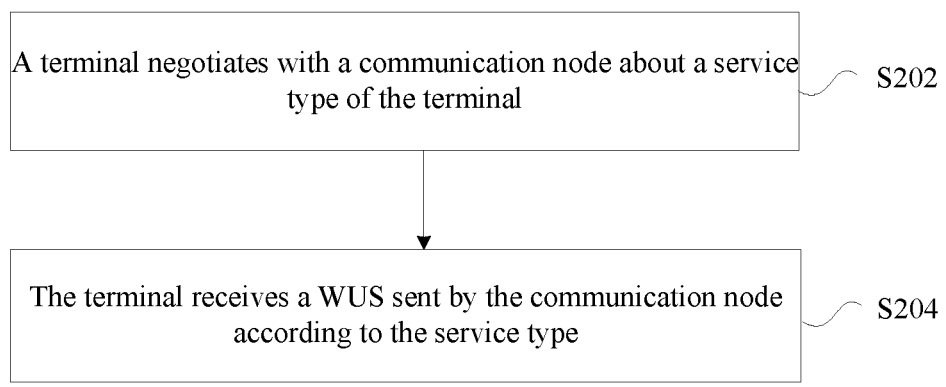
FIG. 2 is a flowchart of a method for receiving a WUS according to an embodiment of the present disclosure.

The embodiment 1 is described from the perspective of a communication node, and the present embodiment is described from the perspective of a terminal, and the two embodiments are in correspondence with each other. Therefore, the embodiment provides a method for receiving a WUS. FIG. 2 is a flowchart of a method for receiving a WUS according to an embodiment of the present disclosure. As shown in FIG. 2, the method includes the following operations.

At operation S202, a terminal negotiates with a communication node about a service type of the terminal.

At operation S204, the terminal receives a WUS sent by the communication node according to the service type.

In some exemplary implementations of the embodiment, the manners in which the terminal negotiates with the communication node about the service type of the terminal involved in the foregoing operation S202 include Manner 1 and Manner 2 which are described in detail as follows.

Manner 1: the terminal sends a first request message to an MME; and the terminal receives a response message that is sent by the MME to the terminal in response to the first request message and carries a service type identifier for indicating the service type.

Manner 2: the terminal sends a second request message to the MME, wherein the second request message carries a service type identifier for indicating the service type; and the terminal receives a response message carrying a service type identifier acknowledgement sent by the MME in response to the second request message.

In another exemplary implementation of the embodiment, another method for negotiating, by the terminal, with the communication node about the service type of the terminal is provided. The method includes the following operations. The terminal receives an SIB message sent by an MME, wherein the SIB message carries information indicating a grouping relation, and the grouping relation is determined by a base station and is used for indicating a correspondence between one service type and one or more sub-service types. The terminal determines the service type of the terminal according to the grouping relation and a sub-service type of the terminal.

That is to say, in another manner for determining the service type in the embodiment, the base station firstly determines the grouping relation, and the terminal determines the service type according to the grouping relation.

It should be noted that the manner in which the terminal receives the WUS sent by the communication node according to the service type involved in operation S204 of the embodiment may be as follows: the terminal receives a WUS sent by the base station according to a group corresponding to the WUS.

In addition, after the terminal receives the WUS sent by the communication node according to the service type in the embodiment, the method in the embodiment may further include an operation that the terminal receives a paging message sent by the base station according to the service type.

It should be noted that the service types involved in the embodiment are divided in at least one of the following manners: dividing according to a service cycle, dividing according to Quality of Service (QoS), and dividing according to a service attribute defined by a core network.

The foregoing Embodiments 1 and 2 of the present disclosure are illustrated below with reference to exemplary implementations.

Exemplary Implementation 1

Figure 3:
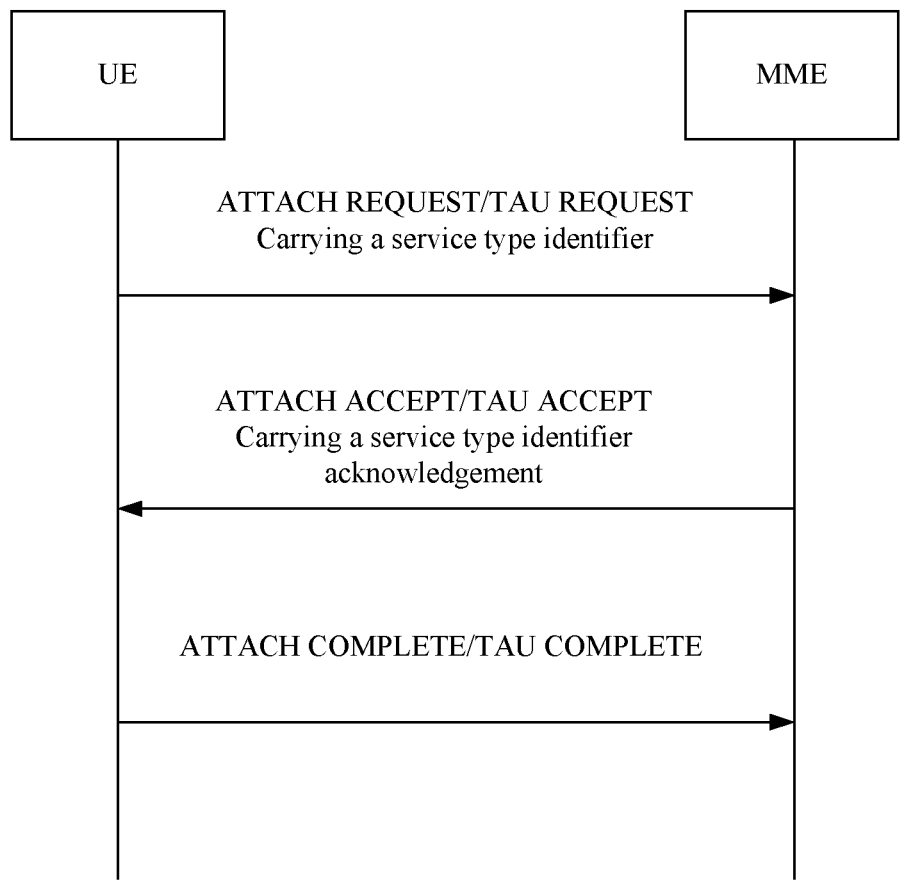
FIG. 3 is a first flowchart for the operation that a terminal negotiates with a communication node about a service type according to an embodiment of the present disclosure.

FIG. 3 is a first flowchart for the operation that a terminal negotiates with a communication node about a service type according to an embodiment of the present disclosure. As shown in FIG. 3, in the exemplary implementation 1, in order to support the division of WUS groups based on a service type, the terminal and the network side need to have clear and consistent service types, therefore the terminal and the communication node (such as an MME) need to negotiate to determine the service type of the terminal. The terminal may negotiate with the MME about the service type via Non-Access Stratum (NAS) signaling in an attach procedure or a Tracking Area Update (TAU) update procedure.

The service types may be divided according to a service cycle (service_id 1: long cycle service, service_id 2: general cycle service, service_id 3: short cycle service), or may be divided in other manners. The terminal and the MME may directly negotiate to use a service type, for example, the service type service_id 1 is determined through negotiation, then the UE may use the service type to directly determine the reception of a group WUS afterwards. Alternatively, the terminal and the MME may only determine one sub-service type through negotiation, and finally the base station needs to indicate which service type to be used in the division of the WUS groups the service type belongs to (which is specifically described in exemplary implementation 3).

Exemplary Implementation 2

Figure 4:
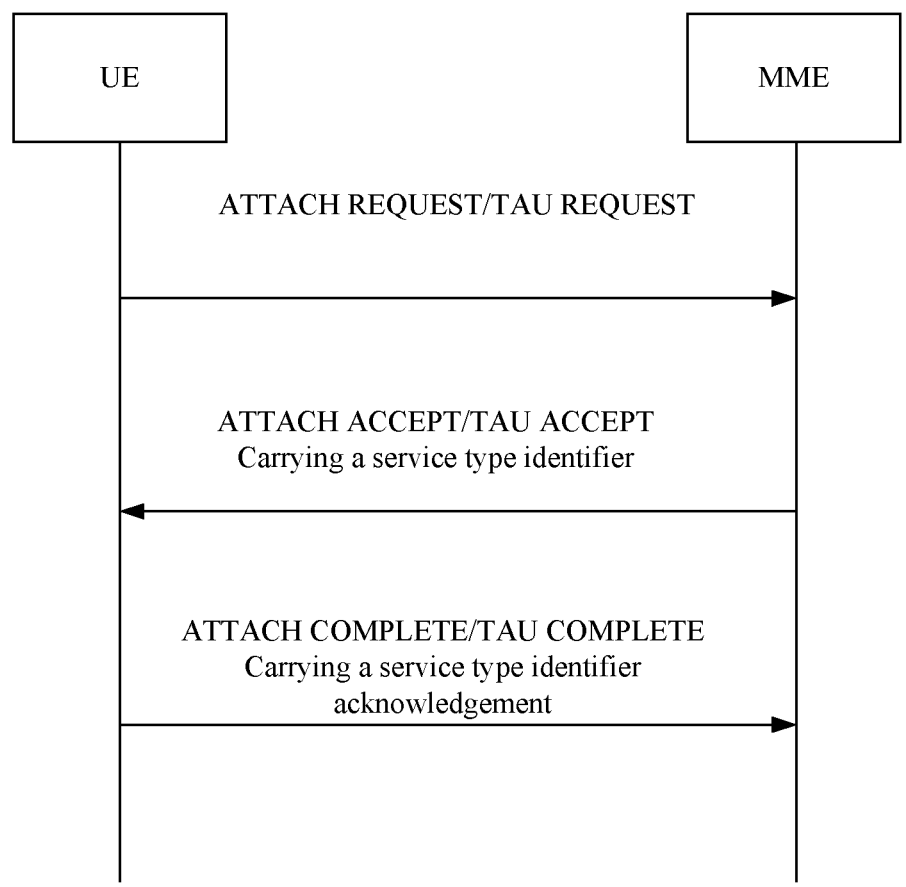
FIG. 4 is a second flowchart for the operation that a terminal negotiates with a communication node about a service type according to an embodiment of the present disclosure.

FIG. 4 is a second flowchart for the operation that a terminal negotiates with a communication node about a service type according to an embodiment of the present disclosure. As shown in FIG. 4, in the exemplary implementation 2, in order to support the division of WUS groups based on a service type, the terminal and the network side need to have clear and consistent service types, and therefore the terminal and the communication node (such as an MME) need to negotiate to determine the service type of the terminal. The terminal may negotiate with the MME about the service type via NAS signaling in an attach procedure or a Tracing Area Update (TAU) update procedure.

The service types may be divided according to a service cycle (service_id 1: long cycle service, service_id 2: general cycle service, service_id 3: short cycle service), or may be determined in other manners. The terminal and the MME may directly negotiate to use a service type, for example, the service_id 1 is determined through negotiation, then the UE may use the service type to directly determine the reception of a group WUS afterwards. Alternatively, the terminal and the MME may only determine one intermediate service type through negotiation, and finally the base station needs to indicate which service type to be used in the division of the WUS groups the service type belongs to (which is described in exemplary implementation 3).

Exemplary Implementation 3

Figure 5:
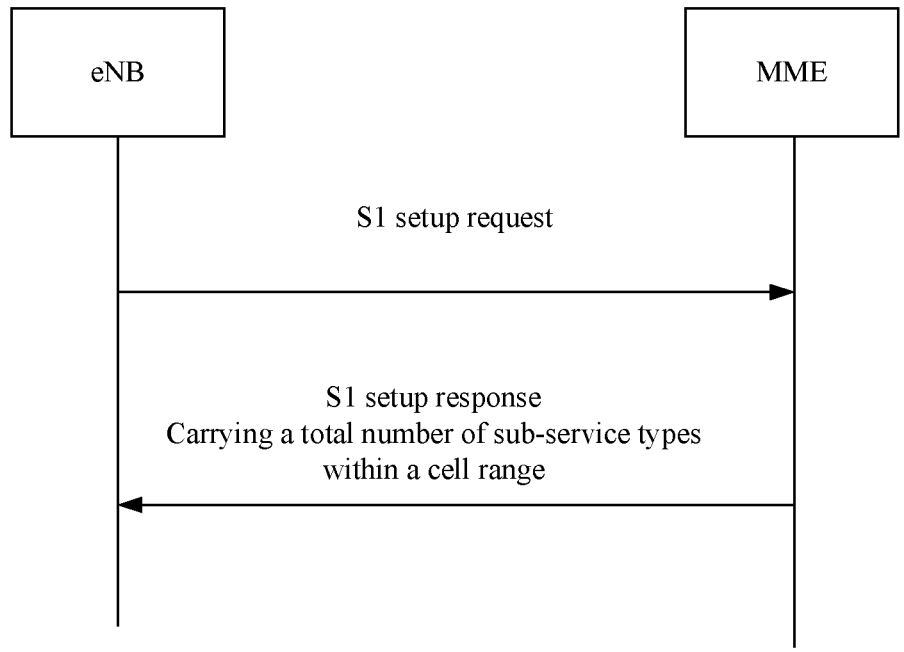
FIG. 5 is a first flowchart for the operation that a base station obtains all service types within a cell range from a network side according to some exemplary embodiments of the present disclosure.
Figure 6:
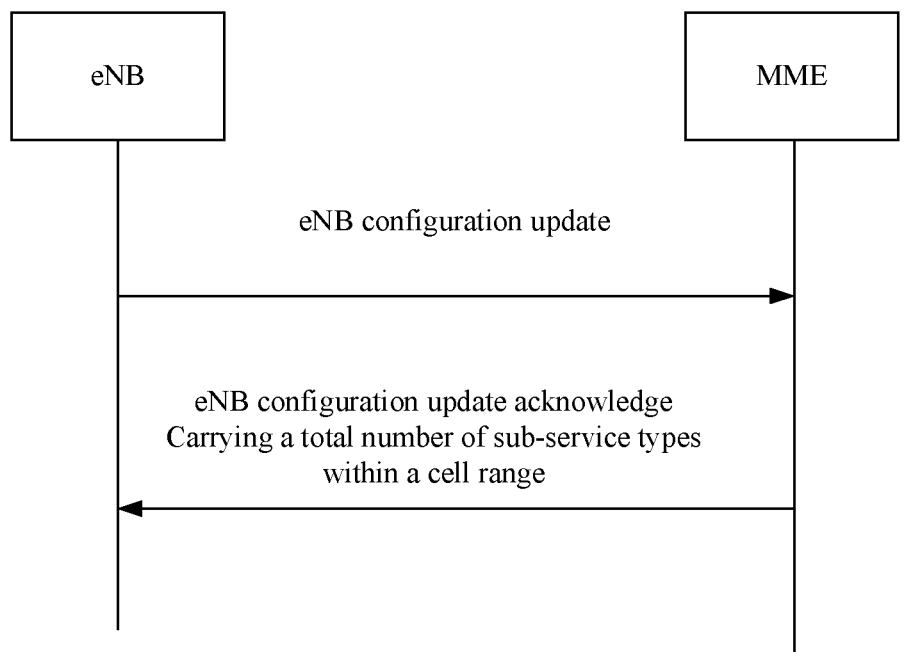
FIG. 6 is a second flowchart for the operation that a base station obtains all service types within a cell range from a network side according to some exemplary embodiments of the present disclosure.
Figure 7:
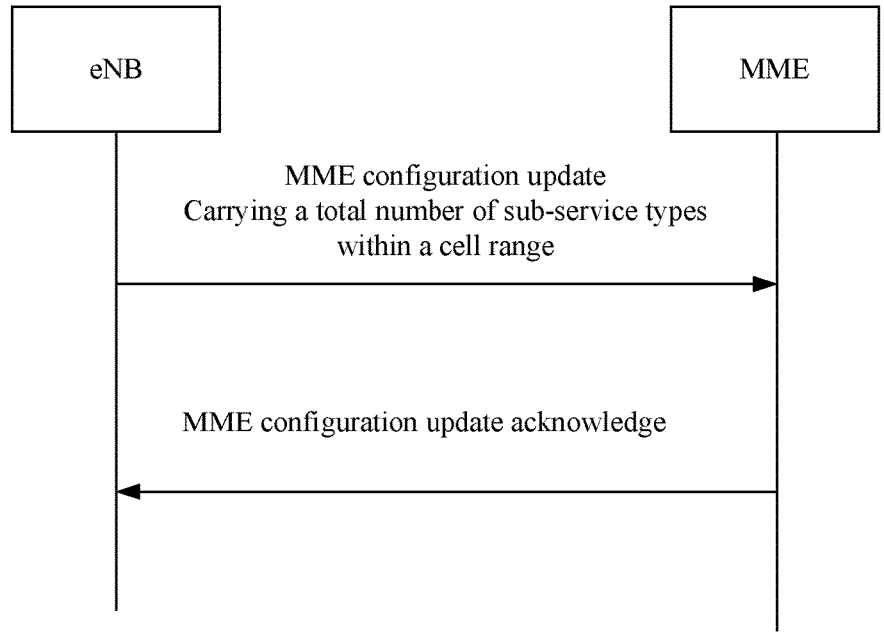
FIG. 7 is a third flowchart for the operation that a base station obtains all service types within a cell range from a network side according to some exemplary embodiments of the present disclosure.

Based on the manners in the foregoing exemplary implementations 1 and 2, if the terminal and the MME only negotiate to determine a sub-service type identifier used for service division, the base station needs to indicate the final service division method. The base station needs to know all the service types of terminals in the cell range of the base station, and then divides service types according to these service types. In this process, the base station firstly needs to obtain all the service types within the cell range from the network side, and the specific process is shown in FIGS. 5, 6 and 7.

The base station determines a specific service division according to all service types within a cell range. For example, it is assumed that the service type identifiers in the cell range include service_id a1, service_id a2, service_id a3, service_id a4, and service_id a5, then possible service groups of the base station are, for example, (service_id 1: service_id a1, service_id a2), (service_id 2: service_id a3, service_id a4, service_id a5). Furthermore, the base station broadcasts this division to the terminal via an SIB message. Based on the service division in the received broadcast message, the UE finally determines the service type identifier to be used in the division of the WUS groups according to the service_identifier determined through the negotiation between the UE and the MME.

In addition, the base station may configure start location information and/or corresponding duration information of each WUS group divided based on the service types.

Exemplary Implementation 4

Figure 8:
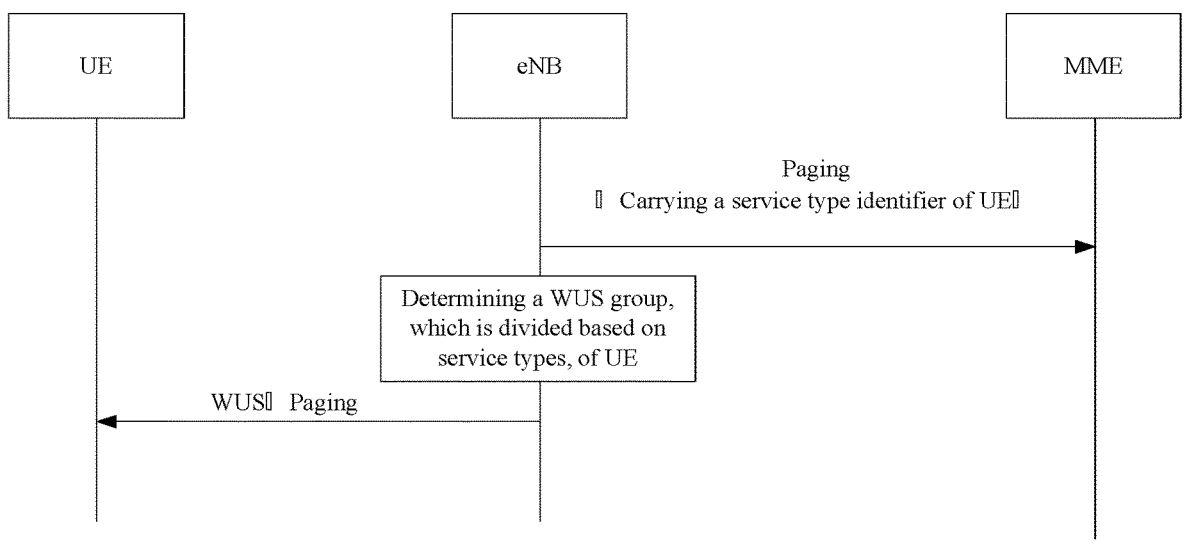
FIG. 8 is a flowchart for the operation that a base station determines a service type of a UE according to a WUS group according to some exemplary embodiments of the present disclosure.

A paging message sent from an MME to an evolved NodeB (eNB) needs to contain service identifier (service ID) information of the UE. According to the service ID information of the UE, the base station directly determines a service type to be used in the division of the WUS groups, or finally determines a service type to be used in the division of the WUS groups according to a service type division method broadcasted by the base station. Afterwards, the base station determines the WUS group identifier (id) of the UE according to the service-based WUS grouping method, the flow of which is shown in FIG. 8.

Exemplary Implementation 5

As described in exemplary implementation 4, the base station obtains the service ID information of the UE from the paging message sent from the MME, and the base station directly determines the service type to be used in the division of the WUS groups according to the service ID information of the UE or the terminal finally determines the service type to be used in the division of the WUS groups according to the service type division method broadcasted by the base station; then the base station determines the WUS group to which the UE belongs according to the service-based WUS grouping method. As long as one UE of the WUS group needs to be paged, the base station sends a WUS at the location corresponding to the WUS group. Before each PO, the UE directly determines the service type to be used in the division of the WUS groups according to its own service ID information or finally determines the service type to be used in the division of the WUS groups according to the service type division method broadcasted by the base station, and then monitors and receives the WUS at the corresponding location of the WUS group.

Exemplary Implementation 6

The base station needs to set configuration information of start location information of the WUS and/or the WUS duration of each service type divided based on the services, and then set, for each service type, the configuration information of start location information and the WUS duration of each group divided based on the UE-ID group.

The UE may obtain the start location information of the first layer of WUS according to its own service type, and then obtain the second layer of accurate WUS location information and/or WUS duration information according to a UE-ID based grouping method.

Exemplary Implementation 7

The base station needs to set the configuration information of the start location information and/or the WUS duration of each group divided based on the UE-ID, and the configuration information of the start location information and/or the WUS duration corresponding to each service type for each group divided based on the services.

The UE obtains a first-layer group according to a UE-ID based grouping method, and then according to a service type and corresponding configuration information, determines the related WUS location information and/or WUS duration information.

Through the description of the above implementations, those having ordinary skill in the art can understand that the method according to the above embodiment may be implemented by means of software plus a necessary general hardware platform, and of course, may also be implemented through hardware, but in many cases, the former is a better implementation. Based on such understanding, the essence of technical solution of the embodiments of the present disclosure, or in other words, the part of the technical solutions making contributions to the conventional art, may be embodied in the form of a software product stored in a storage medium (such as a Read-Only Memory (ROM)/Random Access Memory (RAM), a magnetic disk and an optical disc), including a number of instructions for enabling a terminal device (which may be a mobile phone, a computer, a server, or a network device, etc.) to perform the methods described in various embodiments of the present disclosure.

Embodiment 3

The embodiment provides a device for sending and receiving a WUS. The device is used for implementing the described embodiments and exemplary implementations, and the details having been described will not be repeated. As used below, the term "module" may implement a combination of software and/or hardware of a predetermined function. Although the apparatus described in the following embodiments is preferably implemented in software, the implementation in hardware or a combination of software and hardware is also possible and contemplated.

Figure 9:
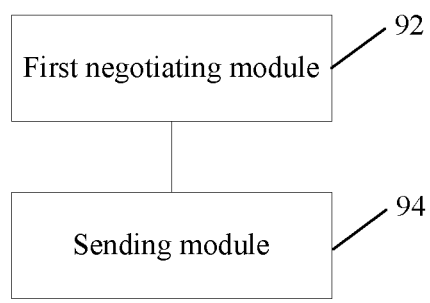
FIG. 9 is a schematic structural diagram of a device for sending a WUS according to an embodiment of the present disclosure.

FIG. 9 is a structural schematic diagram of a device for sending a WUS according to an embodiment of the present disclosure. The device is applied to a communication node. As shown in FIG. 9, the device includes: a first negotiating module 92, configured to negotiate with a terminal about a service type of the terminal; and a sending module 94, coupled to the first negotiating module 92 and configured to send a WUS according to the service type.

In some exemplary implementations, in cases where the communication node is an MME, the first negotiating module 92 includes: a first receiving unit, configured to receive a first request message sent by a terminal; and a first sending unit, configured to send, in response to the first request message, a response message to the terminal, wherein the response message carries a service type identifier for indicating the service type.

In some exemplary implementations, the first negotiating module 92 includes: a second receiving unit, configured to receive a second request message sent by the terminal, wherein the second request message carries a service type identifier for indicating the service type; and a second sending unit, configured to send, in response to the second request message, a response message carrying a service type identifier acknowledgement to the terminal.

It should be noted that the communication node involved in the embodiment may also be a base station, and therefore, before the MME negotiates with the terminal about the service type of the terminal, the device further includes: an acquisition module, configured to obtain all sub-service type identifiers in the cell covered by the base station to obtain sub-service types; and a processing module, configured to group the sub-service types according to service types to obtain a grouping relation, wherein the grouping relation indicates a correspondence between one service type and one or more sub-service types.

In some exemplary implementations, the first negotiating module 92 further includes: a negotiating unit, configured to negotiate with the terminal about a sub-service type of the terminal; a third sending unit, configured to send an SIB message to the terminal, wherein the SIB message carries information indicating a grouping relation.

Figure 10:
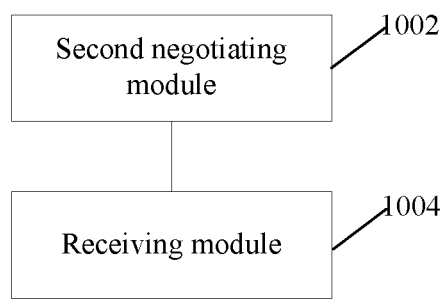
FIG. 10 is a schematic structural diagram of a device for receiving a WUS according to an embodiment of the present disclosure.

It should be noted that, the above content is described from the perspective of the communication node, and for the terminal, the embodiment provides a device for receiving a WUS. FIG. 10 is a schematic structural diagram of a device for receiving a WUS according to an embodiment of the present disclosure. The device is applied to a terminal, and as shown in FIG. 10, the device includes: a second negotiating module 1002, configured to negotiate with a communication node about a service type of the terminal; and a receiving module 1004, coupled to the second negotiating module 1002 and configured to receive a WUS sent by the communication node according to the service type.

In some exemplary implementations, the second negotiating module 1002 includes: a fourth sending unit, configured to send a first request message to an MME; and a third receiving unit, configured to receive a response message that is sent by the MME to the terminal in response to the first request message and carries a service type identifier for indicating the service type.

In some exemplary implementations, the second negotiating module 1002 includes: a fifth sending unit, configured to send a second request message to an MME; wherein the second request message carries a service type identifier for indicating the service type; and a fourth receiving unit, configured to receive a response message that is sent by the MME in response to the second request message and carries a service type identifier acknowledgement.

In some exemplary implementations, the second negotiating module 1002 includes: a second negotiating unit, configured to negotiate with an MME about a sub-service type of the terminal; a fifth receiving unit, configured to receive an SIB message sent by an MME, wherein the SIB message carries information indicating a grouping relation, and the grouping relation is determined by a base station and is used for indicating a correspondence between one service type and one or more sub-service types; and a determination unit, configured to determine the service type of the terminal according to the grouping relation and the sub-service type of the terminal.

It is to be noted that each of the above modules may be implemented by software or hardware. For the latter, the modules may be implemented by, but not limited to, either of the following manners: the above modules are all located in the same processor; or, the above modules are located in different processors in any combination form respectively.

Embodiment 4

The embodiment of the present disclosure provides an electronic device, including a memory and a processor, wherein the memory stores a computer program, and the processor is configured to run the computer program to execute the operations in any one of the method embodiments.

In some exemplary implementations, the electronic device may further include a transmission device and an input/output device, wherein the transmission device is connected to the processor, and the input/output device is connected to the processor.

In some exemplary implementations of the embodiment, the processor may be arranged to execute the following operations when running a computer program:

S1, negotiating with a terminal about a service type of the terminal.

S2, sending a WUS according to the service type.

In some exemplary implementations of the embodiment, the processor may be arranged to execute the following operations when running a computer program:

S1, negotiating with a communication node about a service type of a terminal.

S2, receiving a WUS sent by a communication node according to the service type.

Optionally, specific implementations for the present embodiment may refer to the examples described in the above embodiments and alternative implementations, and details are not repeated in the present embodiment.

It should be understood by a person having ordinary skill in the art that each module or each operation of the embodiments of the present disclosure may be implemented by a general computation apparatus, may be centralized on a single computation apparatus or may be distributed on a network composed of multiple computation apparatuses. Optionally, they may be implemented by using executable program codes of the computation apparatuses. Thus, they may be stored in a storage apparatus and executed by the computation apparatuses, the shown or described operations may be executed in a sequence different from this sequence under certain conditions, or they are manufactured into each integrated circuit module respectively, or multiple modules or operations therein are manufactured into a single integrated circuit module. Thus, the embodiments of the present disclosure are not limited to any specific hardware and software combination.

What is claimed is:

1. A method for sending a Wake Up Signal (WUS), comprising:
   negotiating, by a first communication node, with a terminal about a service type of the terminal;
   determining, by a second communication node, the service type of the terminal; and
   sending, by the second communication node, a WUS according to the service type;
   wherein before negotiating, by the first communication node, with the terminal about the service type of the terminal, further comprising:
   obtaining, by a base station, all sub-service type identifiers in a cell covered by the base station, and obtaining, by the base station, sub-service types in the cell covered by the base station according to all the sub-service type identifiers; grouping, by the base station, the sub-service types according to service types to obtain a grouping relation, wherein the grouping relation indicates a correspondence between one service type and one or more sub-service types; and sending, by the base station, a System Information Block (SIB) message to the terminal, wherein the SIB message carries information indicating the grouping relation;
   wherein the method further comprises:
   configuring, by the base station, the WUS start position information and/or the WUS duration information of each service type divided based on the services, and the start position information and/or the WUS duration information of each group based on the UE_ID grouping method under each service type.

2. The method according to claim 1, wherein negotiating, by the first communication node, with the terminal about the service type of the terminal comprises:
   receiving, by a Mobile Management Entity (MME), a first request message sent by the terminal; and sending, by the MME, a response message to the terminal in response to the first request message, wherein the response message carries a service type identifier for indicating the service type; or,
   receiving, by a Mobile Management Entity (MME), a second request message sent by the terminal, wherein the second request message carries a service type identifier for indicating the service type; and sending, by the MME, a response message carrying a service type identifier acknowledgement to the terminal in response to the second request message.

3. The method according to claim 1, wherein negotiating, by the first communication node, with the terminal about the service type of the terminal comprises:
   negotiating, by a Mobility Management Entity (MME), with the terminal about a sub-service type of the terminal, so that the terminal determines the service type of the terminal according to the grouping relation.

4. The method according to claim 1, wherein sending, by the second communication node, the WUS according to the service type comprises:
   determining, by a base station, a group corresponding to the WUS according to the service type; and
   sending, by the base station, the WUS according to the group corresponding to the WUS.

5. The method according to claim 4, after sending, by the second communication node, the WUS according to the service type, further comprising:
   sending, by the base station, a paging message to the terminal according to the service type.

6. The method according to claim 1, wherein service types are divided in at least one of the following manners:
   dividing according to a service cycle, dividing according to Quality of Service (QoS), and dividing according to a service attribute defined by a core network.

7. A method for receiving a Wake Up Signal (WUS), comprising:
   negotiating, by a terminal, with a first communication node about a service type of the terminal; and
   receiving, by the terminal, a WUS sent by a second communication node according to the service type;
   wherein before negotiating, by the terminal, with the first communication node about the service type of the terminal, further comprising:
   obtaining, by a base station, all sub-service type identifiers in a cell covered by the base station, and obtaining, by the base station, sub-service types in the cell covered by the base station according to all the sub-service type identifiers; grouping, by the base station, the sub-service types according to service types to obtain a grouping relation, wherein the grouping relation indicates a correspondence between one service type and one or more sub-service types; and sending, by the base station, a System Information Block (SIB) message to the terminal, wherein the SIB message carries information indicating the grouping relation;

wherein the method further comprises:
configuring, by the base station, the WUS start position information and/or the WUS duration information of each service type divided based on the services, and the start position information and/or the WUS duration information of each group based on the UE_ID grouping method under each service type.

8. The method according to claim 7, wherein negotiating, by the terminal, with the first communication node about the service type of the terminal comprises:
sending, by the terminal, a first request message to a Mobility Management Entity (MME); and
receiving, by the terminal, a response message that is sent by the MME to the terminal in response to the first request message and carries a service type identifier for indicating the service type.

9. The method according to claim 7, wherein negotiating, by the terminal, with the first communication node about the service type of the terminal comprises:
sending, by the terminal, a second request message to a Mobility Management Entity (MME), wherein the second request message carries a service type identifier for indicating the service type; and
receiving, by the terminal, a response message carrying a service type identifier acknowledgement sent by the MME in response to the second request message.

10. The method according to claim 7, wherein negotiating, by the terminal, with the first communication node about the service type of the terminal comprises:
negotiating, by the terminal, with a Mobility Management Entity (MME) about a sub-service type of the terminal;
receiving, by the terminal, a System Information Block (SIB) message sent by a base station, wherein the SIB message carries information indicating a grouping relation, and the grouping relation is determined by the base station and is used for indicating a correspondence between one service type and one or more sub-service types; and
determining, by the terminal, the service type of the terminal according to the grouping relation and the sub-service type of the terminal.

11. The method according to claim 7, wherein receiving, by the terminal, the WUS sent by the second communication node according to the service type comprises:
receiving, by the terminal, the WUS sent by a base station according to a group corresponding to the WUS.

12. The method according to claim 7, after receiving, by the terminal, the WUS sent by the second communication node according to the service type, further comprising:
receiving, by the terminal, a paging message sent by a base station according to the service type.

13. The method according to claim 7, wherein service types are divided in at least one of the following manners:
dividing according to a service cycle, dividing according to Quality of Service (QoS), and dividing according to a service attribute defined by a core network.

14. A device for sending a Wake Up Signal (WUS), applied to a communication node and comprising a memory storing instructions and a processor in communication with the memory, wherein the processor is configured to execute the instructions to perform the method according to claim 1.

15. A device for receiving a Wake Up Signal (WUS), applied to a terminal and comprising a memory storing instructions and a processor in communication with the memory, wherein the processor is configured to execute the instructions to:
negotiate with a first communication node about a service type of the terminal; and
receive a WUS sent by a second communication node according to the service type;
wherein the service type is divided by a base station based on the following manners:
obtain, by the base station, all sub-service type identifiers in a cell covered by the base station, and obtaining, by the base station, sub-service types in the cell covered by the base station according to all the sub-service type identifiers; groupe, by the base station, the sub-service types according to service types to obtain a grouping relation, wherein the grouping relation indicates a correspondence between one service type and one or more sub-service types; and send, by the base station, a System Information Block (SIB) message to the terminal, wherein the SIB message carries information indicating the grouping relation;
wherein the WUS is configured by the base station based on the following manners:
configure, by the base station, the WUS start position information and/or the WUS duration information of each service type divided based on the services, and the start position information and/or the WUS duration information of each group based on the UE ID grouping method under each service type.

16. The method according to claim 1, wherein determining, by the second communication node, the service type of the terminal comprises:
receiving, by a base station, a paging message from an MME, wherein the paging message contains service identifier (ID) information of the terminal;
according to the service ID information of the terminal, directly determining, by the base station, the service type of the terminal, or finally determining, by the base station, the service type of the terminal according to a grouping relation broadcasted by the base station, wherein the grouping relation indicates a correspondence between one service type and one or more sub-service types.

17. The method according to claim 5, wherein paging message parameters for the paging message are configured in one of the following manners:
the paging message parameters are independently configured for each service type;
a part of the paging message parameters are independently configured for each service type, and a part of the paging message parameters are shared by all service types.

18. A non-transitory computer-readable storage medium, storing a computer program which, when being run by a processor, is configured to cause the processor to perform the method according to claim 1.

19. A non-transitory computer-readable storage medium, storing a computer program which, when being run by a processor, is configured to cause the processor to perform the method according to claim 7.

* * * * *